Sept. 12, 1950 N. E. WAHLBERG 2,522,321
GEAR SELECTING MECHANISM
Filed July 10, 1944 3 Sheets-Sheet 1

INVENTOR.
NILS ERIK WAHLBERG
BY
Carl J. Barbee

Sept. 12, 1950 — N. E. WAHLBERG — 2,522,321
GEAR SELECTING MECHANISM
Filed July 10, 1944 — 3 Sheets-Sheet 2

INVENTOR.
NILS ERIK WAHLBERG
BY Carl J. Barbee

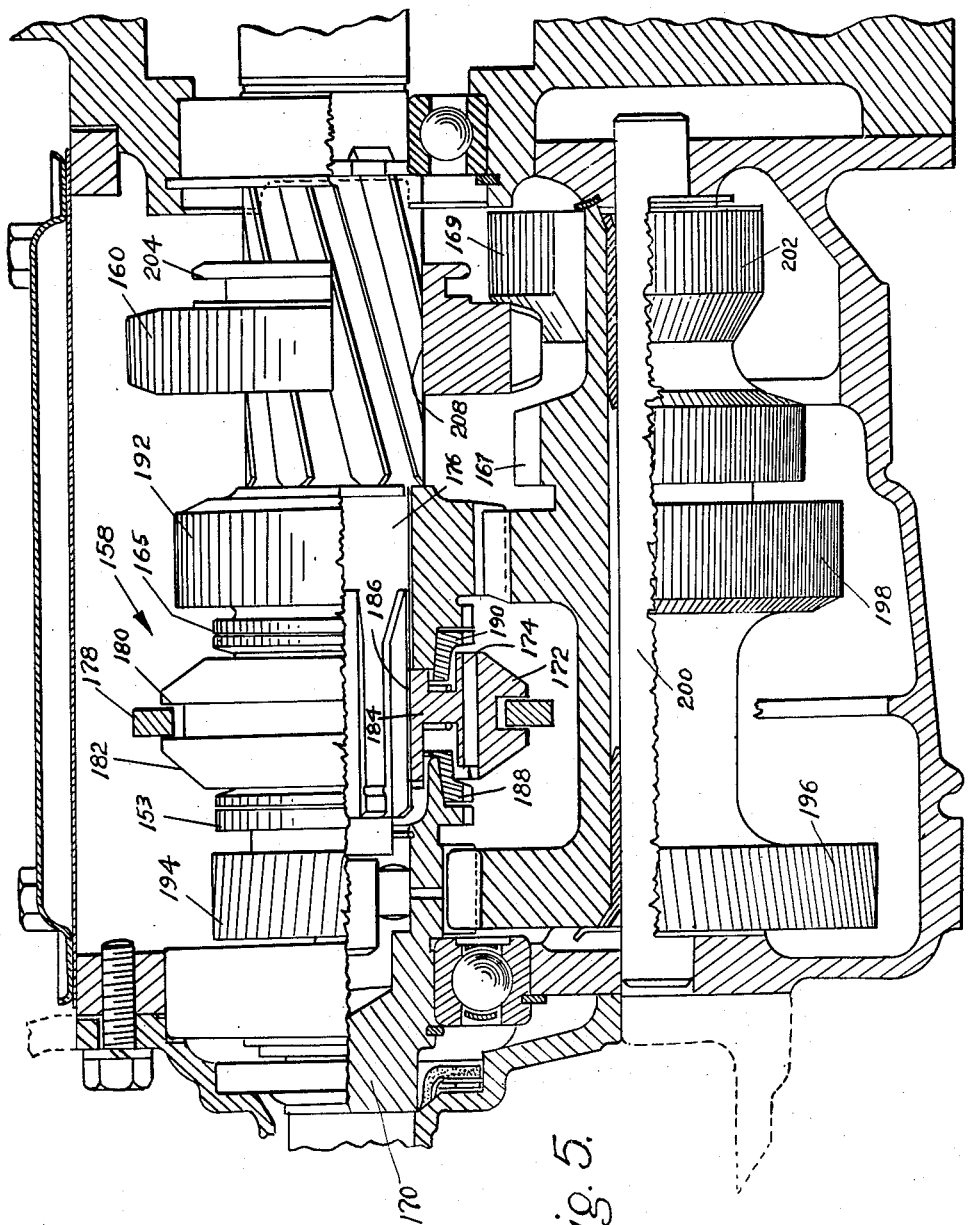

Patented Sept. 12, 1950

2,522,321

UNITED STATES PATENT OFFICE 2,522,321

GEAR SELECTING MECHANISM

Nils Erik Wahlberg, Chicago, Ill., assignor to Nash-Kelvinator Corporation, Kenosha, Wis., a corporation of Maryland Application July 10, 1944, Serial No. 544,243

11 Claims. (Cl. 74—473)

1

This invention relates to remote gear shifting mechanisms and more particularly to a novel arrangement of gear shifting levers on the side of the transmission and their connection to and cooperation with the hand shifting shaft on the steering column.

It is an object of this invention to provide a gear shifting mechanism requiring no lubrication after time of final assembly.

It is a further object of this invention to provide a gear shifting mechanism which will function properly although the operator may force and bend the linkage.

It is a further object of this invention to make the shifting crossover mechanism part of the transmission rather than having it at the usual place on the steering post where maladjustments of shifting rods will cause the crossover to cease functioning with resulting failure of the shifting mechanism.

It is a further object of this invention to provide a crossover mechanism which is extremely light and which is spring urged to the second and high selecting position, the purpose of this arrangement being to prevent inadvertent shifting of the transmission from low gear directly into reverse gear.

Other objects and advantages of this invention will be apparent from a consideration of the following description, claims and the attached drawings, of which there are three sheets, and in which:

Figure 5 is an internal view of the transmission showing the gear trains, partially in section, and associated members.

Figures 1, 2:
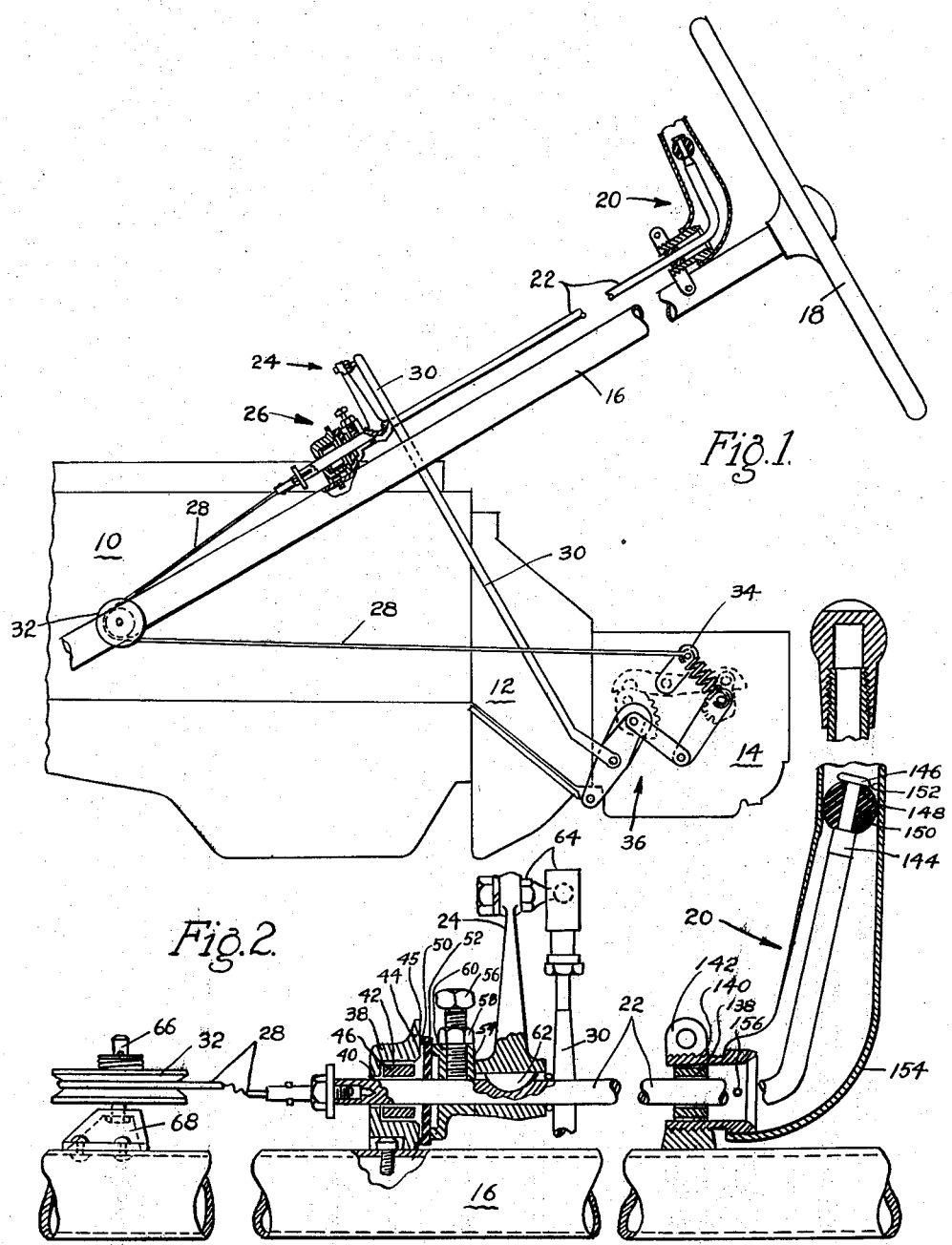
Figure 1 represents a side elevation of an internal combustion automotive engine, transmission and steering column with the gear shifting mechanism associated therewith.
Figure 2 represents a side elevation partially in section of a steering column with a gear shift handle, shifting rod and the lower end of a gear shifting linkage attached thereto.

Illustrated in Figure 1 is an internal combustion engine 10 provided with the usual clutch housing 12 and transmission case 14. In relative position to said engine is shown the steering column 16 provided with the usual steering wheel 18. Mounted on said steering column 16

2 directly under wheel 18 is a gear shifting handle generally indicated at 20 which is connected to a single shifting shaft 22. A lever 24 (shown out of normal position for purposes of clarity) is mounted near the lower end of said shaft 22 directly above a limit mechanism 26 which is attached to column 16; the lower portion of shaft 22 extends through said limit mechanism 26. Link 30 connects lever 24 with the arrangement of shifting levers indicated generally at 36 and located on the side of transmission case 14. A flexible cable 28 is secured at one end to the lower end of shaft 22 and passes over a pulley 32 which is secured on column 16; the other end of cable 28 is connected to interlock lever 34 on the side of transmission case 14.

The novel arrangement of the levers on the side of transmission case 14 will be explained more clearly and concisely in connection with Figures 3 and 4.

Illustrated in Figure 2 are various elements of the invention which are positioned at or near the steering column 16. Near the top of said column 16 is secured gear shifting handle 20 which is shown in conjunction with this invention only for clarity and completeness, this structure being more completely illustrated and described in applicant's previously granted Letters Patent No. 2,286,773, Serial No. 344,689, issued June 16, 1942. Shifting shaft 22 is journaled in bearing 138 which is positioned within sleeve 140. Sleeve 140 is loosely threaded into bracket 142 to permit rotation therein. Bracket 142 is secured to steering column 16. The shifting shaft 22 is bent at nearly right angles and reduced in diameter as at 144. The end 146 is provided with an annular groove 148 within which is positioned a rubber grommet 150. The grommet 150 is of such outside diameter as to fit within the portion 152 of shift handle 20 which is of constant diameter. The handle 20 is installed on the shifting shaft 22 by pressing the tubular portion 152 over the grommet 150 and then tipping the inner end 154 of the handle 20 downwardly over the upper end of shift shaft 22 and sleeve 140. Conical pins are installed at 156 to pivotally mount handle 20 on sleeve 140.

Rotation of handle 20 will turn sleeve 140 in the bracket 142 and will also rotate shift shaft 22 about its axis due to the position of the bent over portion in the handle 20. When the end of handle 20 is raised or lowered, it will pivot around the conical pins at 156 and the tubular section 152 will raise and lower grommet 150 and the end of shift shaft 22 to reciprocate said shift shaft along its axis.

The present invention embodies the use of a single shifting shaft 22 attached at one end to the gear shifting handle 20; near the lower or opposite end of said shaft 22 is positioned a limit mechanism for said shaft, indicated generally at 26 in Figure 1. This limit mechanism, as shown more clearly in Figure 2, comprises a bracket 38 secured to the steering column 16 and having an aperture 40 through which the shifting shaft 22 extends. Bracket 38 has a pocket 42 in which is retained a prelubricated bearing 46 surrounding shifting shaft 22; an outwardly extending flange 44 of bracket 38 provides a seat 48 for the downwardly extending annular flange 50 of resilient washer 52, said washer surrounding shaft 22. On shaft 22 directly above washer 52 is positioned a bracket 54 which is rigidly secured to shaft 22 by a screw 56 and lock nut 58. Bracket 54 has an outwardly and downwardly extending flange 60 which abuts the top of washer 52.

Lever 24 is secured to shifting shaft 22 directly above and resting on bracket 54. A semi-rigid connection is made between said lever 24 and shaft 22 which is comprised of a key 62 provided between lever 24 and shaft 22 so lever 24 will rotate and move with shaft 22, but said key seats in a slot in shaft 22 slightly wider than key 62, thus allowing the said key 62 and lever 24 a small amount of rotation, free of shaft 22, around the axis of rotation of said shaft. This constitutes a lost-motion connection between shaft 22 and lever 24, preventing the transmission of vibrations and engine torque through linkage 30 and lever 24 to shifting shaft 22. Lever 24 and linkage 30 are connected together by an ordinary ball and socket arrangement 64.

The arrangement such as described will provide a cushioning effect on the shifting shaft 22 as the operator drops the said shaft when he shifts from first or reverse gear to second or third gear, the said shaft indirectly falling on a rubber cushion as bracket 54 is rigidly secured to the said shaft and falls on the resilient washer 52 as the shaft 22 is dropped in the shifting. Further, engine torque and vibrations transmitted through the shifting mechanism will be minimized by the lost-motion connection between the shaft 22 and the lever 24 which is the connecting element between the said shaft and the linkage with the shiftable elements of the transmission.

Figure 3:
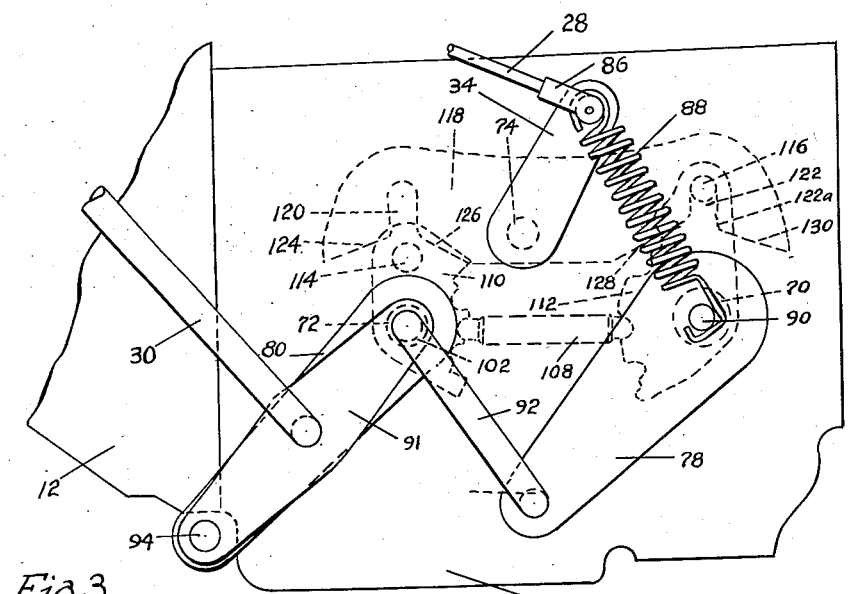
Figure 3 represents a side elevational view of the transmission showing a novel arrangement of shifting levers and various internal members of said transmission.
Figure 4:
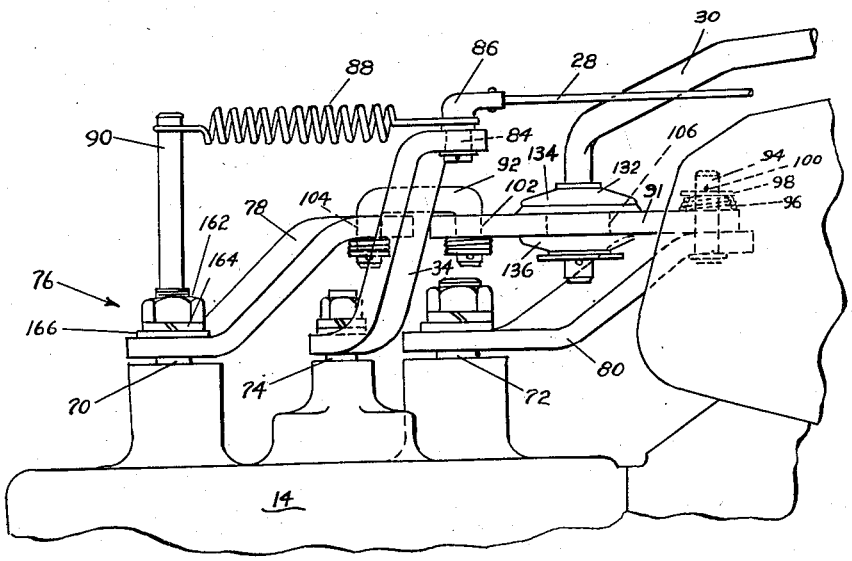
Figure 4 represents a plan view of the shifting lever arrangement on the side of the transmission.

At the lower extreme of shifting shaft 22 there is secured the flexible cable 28 which is the link between the said shaft and interlock lever (shown in Figures 1, 3 and 4). Cable 28 runs over pulley 32 rotatable on shaft 66 which may be secured directly to steering column 16 or indirectly by various means, one of which might be a bracket such as 68.

Located within transmission case 14 is a standard reverse and three speed forward selective gear transmission in which gear speed selection is accomplished by operating the synchronizer, indicated generally at 158 in Figure 5, or splined gear 160 from their neutral positions into engagement with cooperating gears 153, 165, 167 or 169.

The power shaft 170 is formed with a set of clutch teeth 153 which are adapted for engagement by complementary internal clutch teeth 174 formed in clutching sleeve 182, the latter being slidable on a hub 184 which is splined at 186 on shaft 176. Suitable blocker synchronizer mechanism 188 is provided to facilitate smooth and noiseless engagement of the sleeve 182 with the teeth 153.

A similar blocker synchronizer mechanism 190 is provided for facilitating meshing of the teeth of sleeve 182 with the clutch teeth 165 formed on second speed gear 192.

The gear 194 is the input element and is in constant engagement with gear 196, the latter being one of a cluster of gears rotatably carried on a countershaft 200. The cluster also includes a gear 198 which meshes with the second speed driven gear 192, and a low speed gear 167 which is adapted to be engaged by gear 160, which is slidably splined as at 208 on driven shaft 176, and a gear 202 meshed with an idler gear 169 for providing reverse drive, the gear 169 engaging idler gear 169.

Shifting of sleeve 182 to provide two forward speeds is made possible by a groove 180 in the outside surface of said sleeve in which projects a fork 178 attached to the inner end of and actuated by shaft 72 (Figure 4). Shifting of gear 160 to provide low forward speed and reverse speed is made possible by a similar mechanism (not shown) on the inner end of shaft 70 (Figure 4) positioned within groove 204 formed on the side of gear 160.

In Figure 4, shafts 70, 72 and 74 from the shiftable elements within transmission case 14 extend outside said transmission case and various levers are attached thereto. Shafts 70 and 72 extend from the gear shifting elements within and shaft 74 extends from a rocking interlock mechanism within said transmission case. Each of the shafts 70, 72 and 74 is threaded to receive a nut 162 over a washer 166 and lock washer 164 to rigidly secure shift levers 78, 80 and 34 to said shafts as is indicated generally at 76. Shift levers 78, 80 and 34 are secured, as described, to shafts 70, 72 and 74 respectively; said shift levers may be shaped from sheet metal and formed, as shown in Figure 4, to provide clearance between all moving parts of the invention.

In an aperture 84 through the outer end of shift lever 34 is secured a connection 86 with cable 28; said cable is attached at its other end to shifting shaft 22 (Figures 1 and 2). Around said connection 86 is hooked a tension spring 88 which has its opposite end hooked around an extension 90 of shaft 70. Spring 88 cooperates with movement of cable 28 in rotating shifting lever 34. As the operator raises the shifting handle 20 (Figures 1 and 2) to shift into either first or reverse gears, cable 28 will pull shift lever 34 and extend spring 88. As the operator lowers handle 20 to engage second or third gear, the spring 88 will pull lever 34 away from the direction of pull of the cable 28 as said cable will be relaxed by the dropping of rod 22 (Figures 1 and 2).

Shift levers 78 and 80 are connected by a dual linkage which may comprise a flat, metal stamping 91 and a U-shaped rod 92. Stamping 91 and lever 80 are connected at their ends by a bolt 94 extending through corresponding apertures in said stamping and lever. A compression spring 96 is interposed between stamping 91 and washer 98 which is held on bolt 94 by a pin 100 through an aperture in said bolt 94. Spring 96 provides a semi-flexible connection and holds stamping 91 and lever 80 together. In the other end of stamping 91 is an aperture 102 through which extends one end of U-shaped rod 92, its other end extending through aperture 104 in the outer end of lever 78. The ends of U-shaped rod are secured the same and for the same purpose as bolt 94.

A portion of linkage 30 extends through an aperture in resilient grommet 132 which extends through an aperture 106 in stamping 91. Grommet 132 has extending flanges 134 and 136 to secure it within aperture 106. Grommet 132 insulates the connection of stamping 91 and linkage 30 to minimize the transmission of engine torque and vibrations through said linkage.

In Figure 3 the side elevational view of the elements of the invention described in conjunction with Figure 4 is shown with some cooperable elements within the transmission case 14 shown also. These elements within the transmission case 14 include ordinary speed-selecting poppet means 108 cooperable with shiftable elements 110 and 112. Element 110 rotates around the axis of shaft 72 as lever 80 is rotated therearound; element 112 rotates around the axis of shaft 70 as lever 78 is rotated therearound. Pin 114 is carried by element 110 and pin 116 by element 112. Interlock 118 rotates around the axis of shaft 74 as lever 34 is rotated therearound, said interlock having slots 120 and 122 which alternately engage pins 114 and 116, respectively. Interlock 118 is provided with straight surfaces 124 and 126 to abut pin 114 as it is rotated around the axis of shaft 72, thus keeping slot 122 around pin 116. Pin 116 slides along straight surfaces 128 and 130 as it is rotated around the axis of shaft 70, thus keeping pin 114 within slot 120 as the gears cooperable with element 112 are being shifted and engaged. Thus, only one of elements 110 and 112 may be rotated at one time as the rotating element indirectly, through its pin in engagement with one of the above described surfaces, holds the other element locked.

This interlock mechanism combined with the novel arrangement of shifting levers makes necessary the use of only a single linkage 30 between said levers and the shifting mechanism on the steering column 16 (Figures 1 and 2). The invention incorporates the use of the ordinary movements of shifting gears in an automobile where the operator raises and pushes up the handle 20 (Figures 1 and 2) to engage the reverse gear, raises and pulls to engage first gear, lowers and pushes to engage second gear, and lowers and pulls to engage third gear.

As the operator raises handle 20 from neutral position, cable 28 is pulled, rotating lever 34, shaft 74 and interlock 118 in a counter-clockwise direction around the axis of shaft 74 and forcing slot 120 over pin 114, thus locking element 110 and lever 80 and preventing shifting of gears cooperable therewith, the slot 122 having been raised out of its position locking pin 116. This leaves the gears cooperable with element 112 and lever 78 free to be shifted. These gears, in this case, are the reverse and first gears.

If the operator wishes to engage reverse gear, he now pushes handle 20 which rotates shaft 22 and lever 24 in a counter-clockwise direction pulling linkage 30, thus rotating stamping 91 in the counter-clockwise direction around the axis of bolt 94 which is held in a fixed position as lever 80 is locked. Thus rotating stamping 91 rotates lever 78 in a clockwise direction around the axis of shaft 70 as stamping 91 and lever 78 are connected by rod 92; rotation of lever 78 thereby moves cooperable elements within transmission case 14 and the shifting operation is complete.

If the operator wishes to engage first gear, he will pull handle 20 instead of pushing to engage reverse, which will push linkage 30, thus rotating stamping 91 in a clockwise direction around the axis of bolt 94 with the result that lever 78 through its connection 92 with stamping 91 will be rotated around the axis of shaft 70 in a counter-clockwise direction.

The interlock mechanism 118 is constructed so as to make impossible inadvertent shifting directly into reverse gear from engagement of first (low) gear. Surfaces 128 and 130 of interlock mechanism are not concentric in regard to the arc of travel of pin 116; surface 130 is lower than surface 128. Surface 128 is held against the upper surface of pin 116 by spring 88 when low gear is in engagement. This upper surface of pin 116 traces the outer extremity of the arc of pin 116 as it is moved. As pin 116 leaves engagement with surface 128 upon clockwise rotation toward engagement of reverse gear by the operator, it will enter the lower portion of slot 122 and if rotated further, it will strike the edge 122a of slot 122, thus preventing engagement of reverse gear.

If the operator wishes to engage reverse gear, he must raise handle 20, Figure 1, higher than necessary to engage low gear, thus pulling cable 28 further and increasing rotation of interlock mechanism 118 in a counter-clockwise direction. The said interlock mechanism must be rotated enough to allow pin 116 to engage surface 130.

The use of this interlock mechanism prevents inadvertent clashing of reverse gear as the operator shifts from low gear. Unless the handle 20 is raised manually, as described above, when pin 116 strikes the edge 122a, tension spring 88 will tend to pull slot 122 over pin 116 locking it and unlocking pin 114. This will permit engagement of second or high gears, which is the usual procedure when shifting from low gear.

When low gear is in engagement, handle 20 may be lowered to the position it assumes when high gear is engaged. This is possible because surface 128 is held in firm engagement with pin 116 by spring 88 actuating lever 34, and thus there is no momentary function for cable 28 which is actuated by handle 20.

If the operator wishes to engage second gear from this engagement of first gear, he merely pushes handle 20 (in the lower high-gear position) as if he actually were shifting from high gear to second gear. On reaching neutral position in the operation, pin 116 will strike edge 122a, preventing engagement of reverse gear and spring 88 will pull slot 122 over pin 116, locking said pin. This latter automatic operation is possible as cable 28 was slackened by lowering handle 20 to its high-gear-engagement position when low gear was actually in engagement.

The operator may wish to shift from first gear to high gear. In this case, handle 20 may also be lowered to high position when low gear is still engaged but must be pushed to neutral position to remove pin 116 from engagement with surface 128 and align pin 116 with slot 122 to allow spring 88 to slide slot 122 over pin 116, locking the low and reverse gears. The handle is then moved from this lower neutral position back to normal high-gear-engagement position, engaging the desired high gear.

In shifting from reverse gear engagement, this invention operates in the same manner: If reverse gear is engaged, the handle 20 may be lowered to its normal second-gear-engagement position, from which position the other three gears (low, second and high) may be engaged in the reverse of the manner described above in connection with the low gear engagement.

If the operator wishes to engage second gear, he will push handle 20 in its lowered position as he did to engage reverse gear when said handle was in its raised position. The power thus exerted will be transmitted to stamping 91 by linkage 30. As lever 78 is now locked, stamping 91 cannot rotate around the axis of bolt 94 but must rotate around the axis of the portion of the U-shaped rod 92 which extends through aperture 102. As lever 80 is now unlocked, it will be rotated by this pulling force around the axis of rotation of shaft 72 in a clockwise direction in conjunction with the movement of stamping 91, thus moving shiftable elements within the transmission case 14. To engage third gear, the operator will pull handle 20 and will thus rotate stamping 91 and lever 80 around the same axes but in the counter-clockwise direction.

While I have described my invention in some detail, I intend this description to be an example only and not limiting on my invention, to which I make the following claims:

1. A shifting mechanism comprising a hand lever, a transmission, gear trains within said transmission having shiftable elements, shifting means for said elements carried on shafts extending to the outside of said transmission, levers secured on the extending portions of said shafts, movable means directly interconnecting said levers, said levers being moved by the hand lever through a linkage between said hand lever and said movable means, a rocking interlock controlling the shiftable elements of the transmission, said interlock being secured internally of the transmission on a shaft extending through the side of said transmission, an interlock lever secured to the external portion of said interlock-carrying shaft actuating the interlock, a single linkage between said lever and the hand lever, and a tension spring providing rotating force on said interlock lever.

2. A shifting mechanism comprising a hand lever, a transmission, gear trains within said transmission and having shiftable elements, shifting means for said elements carried on shafts extending to the outside of said transmission, levers secured to the outer portions of said shafts, linkage between said levers, said levers being connected through a single linkage with the hand lever, a rocking interlock controlling the shiftable elements, said interlock located within the transmission on an interlock shaft extending through the side of said transmission, an interlock lever secured to the external portion of said interlock-carrying shaft, a single linkage between said lever and the hand lever, and a tension spring exerting opposite rotating forces on said interlock lever.

3. A transmission unit having shiftable elements, shafts for controlling the elements, said shafts being rotatable about substantially parallel axes, means rotatable with the shafts, a pin carried by each of said means and movable therewith, and a pivoted bar having recesses to receive the pins, said bar being so pivoted that when one pin is capable of being moved away from its companion recess the other pin is locked in the other recess, thereby providing an interlock for the shiftable elements, said recesses being formed between straight cam surfaces on the bar, said surfaces abutting the pins as they are rotated.

4. A transmission unit having shiftable elements, an interlock mechanism alternately locking said shiftable elements, shafts for controlling said elements and extending to the outside of the transmission, levers on the outside ends of said shafts to rotate the shafts, means secured to the levers and connected to each other forming a linkage between the levers, and manually operated means rotatably secured intermediate the ends of one of the means secured to the levers for moving said linkage and said levers.

5. A transmission interlock device comprising an interlock plate connected to a shaft, a plurality of gear shifting means each comprising a rock shaft operable to select one of a plurality of transmission speeds, locking recesses formed in said plate, straight cam surfaces leading from the sides of the locking recesses in said plate, and follower means carried by the rock shafts and engageable with the cam surfaces for rotating the plate about said shaft and for reception within the locking recesses when in neutral position.

6. A transmission interlock comprising a plurality of gear shifting means each comprising a rock shaft operable to select one of a plurality of transmission speeds, an interlock plate connected to a shaft, recesses formed in said plate, said plate having a plurality of straight cam surfaces leading from the sides of the recesses in said plate, and follower means carried by the rock shafts and engageable with the cam surfaces for reception within the locking recesses, one or more of the surfaces extending beyond the end of the other surface of its recess to its joinder with a cam surface, thus necessitating further rotation of the plate to permit engagement of said cam surface by the follower means.

7. A shifting mechanism comprising a steering column, a transmission unit having a plurality of shifting means, a hand lever, a shifting rod journaled through a bracket on said steering column and having said hand lever mounted on its upper portion, a shifting lever secured to the shifting rod and rotatable therewith, a limit mechanism secured to the steering column and through which the shifting rod is journaled, the shifting lever being directly above said limit mechanism preventing the shifting rod moving longitudinally through said limit mechanism beyond a predetermined point, a cable secured at its one end to the end of the shifting rod and having its other end secured to the shifting means, and a single link connecting the shifting lever to the shifting means of the transmission.

8. A transmission unit comprising shiftable elements, a case for said unit, shafts which extend through said case for controlling said elements, means rotatable with the shafts, an interlock alternately locking said rotatable means, levers secured to said shafts for transmitting motion thereto, means rotatably secured to the free ends of the levers and joined at their free ends forming a flexible link between the said levers, and a connection with a manually controlled link intermediate the ends of one of said means.

9. A transmission unit comprising a plurality of shiftable elements, means extending from said transmission cooperable with said shiftable elements, an interlock mechanism alternately locking said elements, a lever carried by each of the means extending from the transmission to transmit externally applied energy to the shiftable elements, and a linkage between said levers for cooperable movement thereof comprising two units connected at two ends with the remaining free ends connected to the free ends of the levers.

10. A limit mechanism for a shifting rod which is positioned parallel to the steering column of a vehicle comprising a bracket secured to said steering column with an aperture through which said rod extends, a resilient washer around said rod having a downwardly turned flange which is seated on the upper surface of the bracket, and a sleeve rigidly secured around the shifting rod having an outwardly and downwardly turned flange which abuts the said resilient washer.

11. A shifting mechanism comprising a transmission unit having a plurality of shiftable elements, a hand lever remote from said transmission unit, a shifting rod secured to and movable by said hand lever, a shifting lever on said rod rotatable by said rod, means for reciprocating the shiftable elements, a flexible connection between said means for shifting of either separately, and a single link connected between the shifting lever and said connection.

NILS ERIK WAHLBERG.

REFERENCES CITED

The following references are of record in the file of this patent:

UNITED STATES PATENTS

| Number | Name | Date |
| --- | --- | --- |
| 2,182,252 | Dolza et al. | Dec. 5, 1939 |
| 2,193,218 | Best | Mar. 12, 1940 |
| 2,275,779 | MacPherson | Mar. 10, 1942 |
| 2,299,889 | Fishburn | Oct. 27, 1942 |
| 2,301,816 | Rubly | Nov. 10, 1942 |
| 2,334,421 | Leach | Nov. 16, 1943 |
| 2,363,979 | Land et al. | Nov. 28, 1944 |
| 2,366,655 | Russey | Jan. 2, 1945 |